Oct. 24, 1950  Z. DURAND  2,526,812
MARINE TYPE RICE HARVESTER

Filed April 6, 1948  2 Sheets-Sheet 1

Inventor
Z. Durand
By G. S. Roxburgh
His Atty

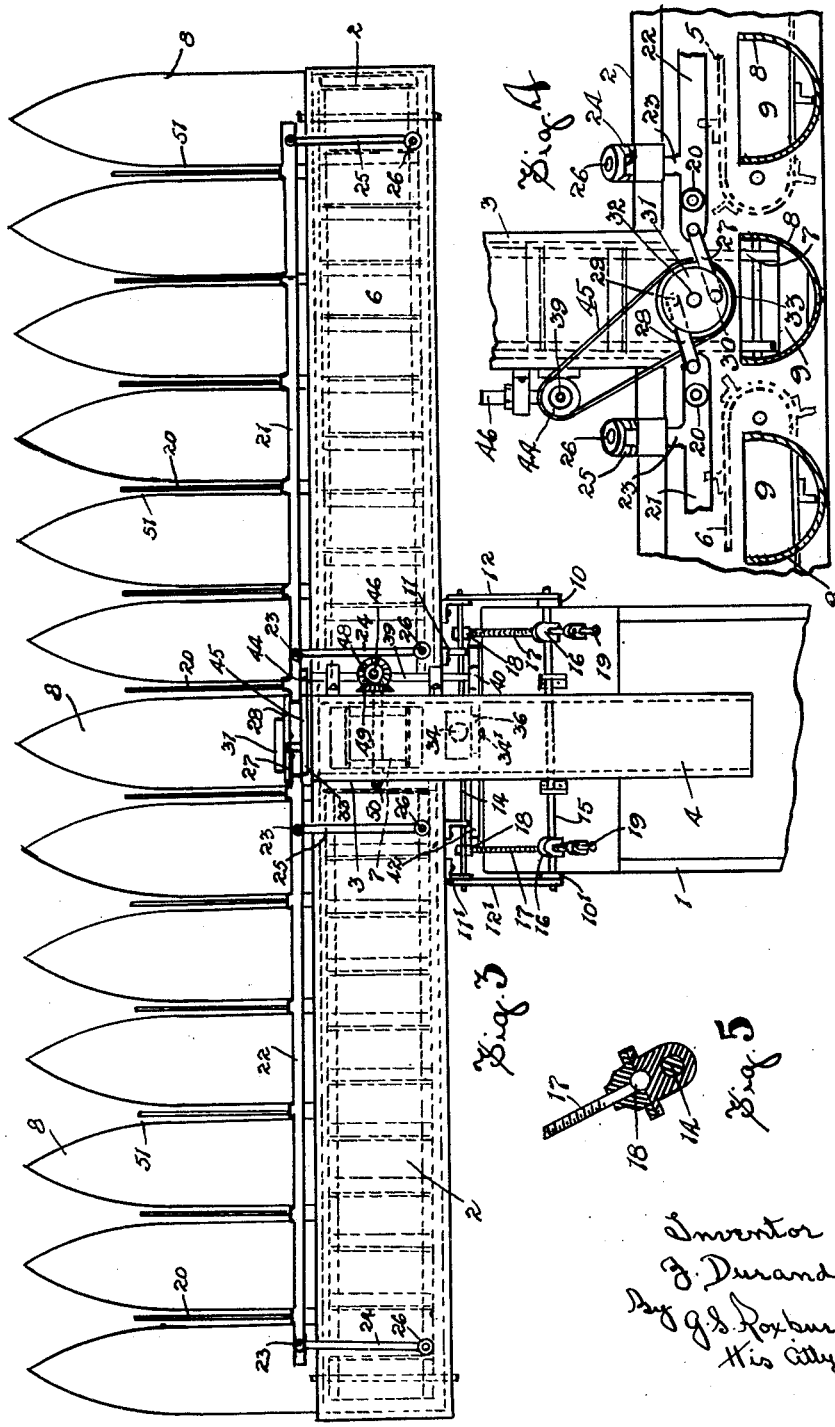

Patented Oct. 24, 1950

2,526,812

UNITED STATES PATENT OFFICE 2,526,812

MARINE TYPE RICE HARVESTER

Zenobe Durand, Winnipeg, Manitoba, Canada

Application April 6, 1948, Serial No. 19,359

2 Claims. (Cl. 56—9)

1

The invention relates to harvesting machines and particularly to a machine for harvesting wild rice and other such crops and a general object of the invention is to provide a large capacity machine which can be propelled through the rice field and will gather the rice as the machine advances and deliver it to a central collecting point for bagging or other disposal.

A further object is to provide a machine which can be supported from the forward end of a boat and easily and quickly adjusted vertically to best accommodate it to the conditions of the rice field in which it is operating.

A further object is to provide a machine which carries its own prime mover, such as a gasoline engine, for driving all the working parts.

A further object is to provide a machine having a relatively long, transverse, rice collecting box supplied with a plurality of forwardly extending and spaced, pointed, rice receiving pans delivering into the box and to supply the box with endless, driven conveyors delivering to a central elevator leg equipped with an endless driven convyor, discharging through a discharge spout to the boat which carries and moves the machine through the rice field.

A further object is to so construct and space the rice receiving pans that the rice stems in the field are parted and directed in standing rows into the comparatively narrow spaces reserved between the pans and also to provide the machine with beaters adapted to strike and agitate the stems in the rows and thus cause the discharge of the rice seeds into the underlying pans.

With the above more important and other minor objects in view, which will become more apparent as the description proceeds, the invention consists essentially in the arrangement and construction of parts hereinafter described, reference being had to the accompanying drawings in which:

Fig. 3 is a plan view of the machine.

Fig. 4 is an enlarged vertical sectional view at 4—4, Fig. 1, and looking rearwardly at the central forepart of the machine.

Fig. 5 is a sectional view showing the ball and socket joint.

In the drawings like characters of reference indicate corresponding parts in the several figures.

Figure 1:
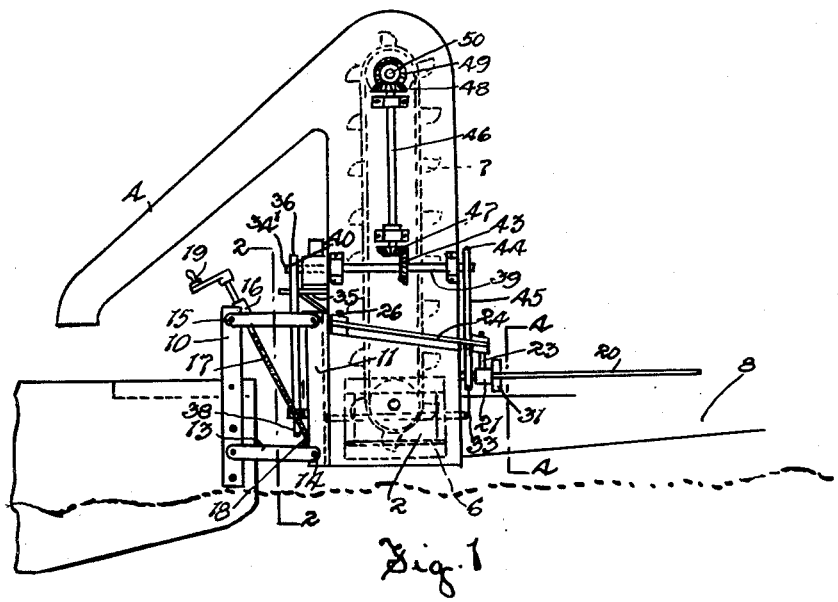
Fig. 1 is a side view of the harvesting machine and showing it adjustably attached to the front end of a boat.

The machine is particularly designed for harvesting wild rice which grows in water and is reached by boat. The forward end of the boat 1 is shown and my machine is adjustably secured to such forward end in a manner such that it can be adjusted vertically to best accommodate its operation in the crop being harvested.

In constructing my machine I provide a horizontally disposed, transverse collecting box 2 which is provided centrally with an upstanding elevator leg 3 provided with a delivery spout 4 adapted to discharge elevated rice into the boat. The box has similar, endless, slatted and driven conveyors 5 and 6 therein, of well known type, which when in operation deliver the rice in the box to the lower end of the elevator leg where it is picked up by a driven, endless, cup conveyor 7 and discharged through the spout.

To the forward side of the box I secure permanently in any suitable manner, a plurality of similar, spaced, forwardly tapering and pointed rice receiving pans 8 which are designed to pass through the rice field as the boat advances and direct rice deposited therein, into the lower part of the box through suitable openings 9 (see Fig. 4) provided in the front face of the box. These pans also part the rice stems and direct them into the spaces reserved between the pans.

The means herein shown for adjustably supporting the machine is now described. To the sides of the boat, adjacent the front end, I secure permanently a pair of opposing uprights or posts 10 and 10' and directly opposite these and to the back wall of the box I fasten a pair of angle bars 11 and 11' and then I connect the upper and lower ends of the uprights and angle bars by upper and lower pairs of parallel swinging links 12, 12' and 13, 13'. The forward ends of the lower links are swung from a lower cross shaft 14 and the rear ends of the upper links are swung from an upper cross shaft 15. The latter shaft has a pair of similar bearings 16 mounted thereon and these receive angularly disposed jack screws 17 the lower ends of which are connected to the shaft 14 by a ball and socket joint 18 (see Fig. 5). Cranks 19 are secured to the upper ends of the jack screws and obviously one by manipulating the cranks can raise or lower the box and consequently bring the rice receiving pans to best operating position considering the particular crop in which the machine is operating.

It is desirable to provide agitators or beaters to strike the rice stalks in a location above the pans and these are in the form of sets of similar, spaced, horizontal rods 20 extending forwardly from similar agitating bars 21 and 22 positioned above the pans and directly in advance of the front side of the box. It will also be noted that in their central positions the rods are centrally above the spaces between the pans.

Each of the bars just above mentioned, is carried by a pair of vertically extending spindles 23 pivotally carried by the forward ends of a pair of sway bars or arms 24 and 25 which overlie the box and have their rear ends pivotally secured thereto at 26. The inner ends of the bars 21 and 22 are connected by links 27 and 28 to eccentric pins 29 and 30 extending from a disc 31 rotatably mounted on a stub shaft 32 secured centrally to the front side of the box. A driving pulley 33 is associated with the disc.

Any suitable means can be employed for driving the several conveyors and for agitating the beaters and in this connection it is to be distinctly understood that the means shown in the drawings and hereinafter described is not to be considered as restrictive, but only as one of the many arrangements of drive which may be employed for the purpose. Further throw out clutches of well known type can be installed wherever it is thought desirable to employ them in the driving mechanism.

Figure 2:
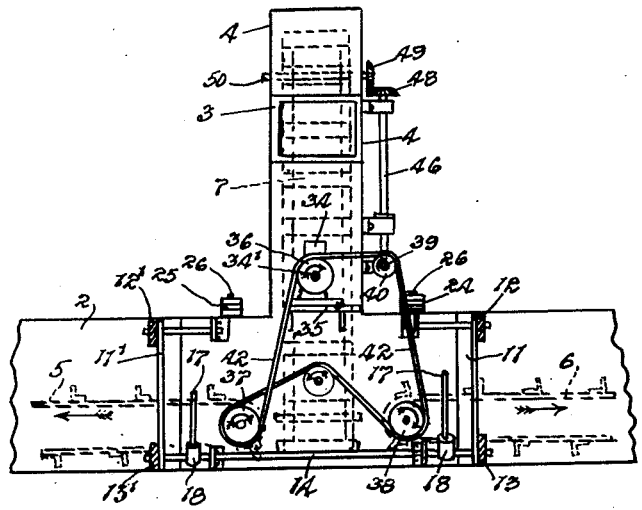
Fig. 2 is a vertical sectional view at 2—2, Fig. 1.

A gasoline engine 34 is mounted on a table or shelf 35 secured to the back wall of the elevator leg and the drive shaft 34' of the engine is supplied with a pulley 36. The inner ends of the conveyors 5 and 6 are equipped with pulleys 37 and 38 and on one side of the elevator leg I mount rotatably a cross shaft 39 the rear end of which is supplied with a pulley 40. An idler pulley 41 is mounted on the rear side of the box and an endless driving belt 42 passes over the pulleys 36 and 40, down around the pulley 38, over the pulley 41 and down around the pulley 37 (see Fig. 2).

The shaft 39 is supplied with a bevel gear 43 and with a front pulley 44 and the latter pulley is connected by a belt 45 to the pulley 33 hereinbefore mentioned. A vertical shaft 46 is rotatably mounted on the elevator leg and has its lower end supplied with a bevel gear 47 meshed with gear 43 and its upper end supplied with a bevel gear 48 meshed with a bevel gear 49 located on the protruding end of the upper shaft 50 of the leg conveyor.

While I have shown belts and pulleys herein, chains and chain wheels could be substituted if found more desirable.

When the machine is to be used the boat is propelled through the grass like crop of wild rice and with the engine running and as the boat advances, the pointed ends of the pans part the rice stems and direct them into the relatively narrow passages 51 (see Fig. 3) reserved between the pans. The rows of rice stems in the passages are struck and agitated by the beaters 20 and this effectively loosens the rice seeds to drop down into the underlying pans where they slide rearwardly, under the influence of gravity, into the box through the openings 9. The seeds deposited in the box are carried inwardly by the conveyors 5 and 6 to the conveyor 7 which discharges them through the spout 4 into the boat where they can be bagged or otherwise disposed of.

Obviously the attendant in the boat can adjust the pans to best advantage in relation to the stems of the rice crop, by turning the cranks 19 in the desired direction.

It may be found that it is desirable to provide means, other than gravity, for feeding the rice seeds over the bottoms of the pans into the box, and if so driven conveyors of other positive delivery means could readily be supplied for the purpose.

What I claim as my invention is:

1. A harvesting machine for wild rice and similar crop comprising a transverse, horizontally disposed rice collecting box, a central elevator leg carried by the box and provided with a discharge spout, endless driven conveyors within the box and leg adapted to direct rice to the spout to be discharged therethrough a plurality of forwardly extending, spaced, similar, horizontally disposed and pointed rice receiving pans secured to the box and discharging thereinto, and driven beaters overhanging the spaces between the pans.

2. A harvesting machine for rice and similar crop, comprising a transverse, horizontally disposed rice collecting box, a central elevator leg carried by the box and provided with a discharge spout, endless driven chain conveyors in the box and leg adapted to direct rice to the spout for discharge therethrough, means secured to the front of the box for parting the rice stems and directing them in standing rows in front of the box and as the machine is advanced, said means also serving to collect deposited rice and direct it into the box and driven beaters associated with said means for striking and agitating the rows of stems.

ZENOBE DURAND.

REFERENCES CITED

The following references are of record in the file of this patent:

UNITED STATES PATENTS

| Number | Name | Date |
| --- | --- | --- |
| 325,109 | Naff | Aug. 25, 1885 |
| 636,085 | Temple | Oct. 31, 1899 |
| 1,269,515 | Wyckoff | June 11, 1918 |
| 1,293,706 | Charboneau | Feb. 11, 1919 |
| 1,344,626 | Ellis | June 29, 1920 |
| 1,372,282 | De Brandt | Mar. 22, 1921 |
| 1,379,112 | Luedke | May 24, 1921 |
| 1,418,542 | Dill | June 6, 1922 |
| 1,604,548 | Luedke | Oct. 26, 1926 |